(12) United States Patent  
Williams et al.

(10) Patent No.: US 7,421,561 B2  
(45) Date of Patent: Sep. 2, 2008

(54) INSTRUCTION SET FOR EFFICIENT BIT STREAM AND BYTE STREAM I/O

(75) Inventors: Kenneth Mark Williams, San Jose, CA (US); Scott Daniel Johnson, Mountain View, CA (US); Bruce Saylors McNamara, Palo Alto, CA (US); Albert RenRui Wang, Los Altos, CA (US)

(73) Assignee: Stretch, Inc., Mountain View, CA (US)

( * ) Notice: Subject to any disclaimer, the term of this patent is extended or adjusted under 35 U.S.C. 154(b) by 285 days.

(21) Appl. No.: 10/686,882

(22) Filed: Oct. 15, 2003

(65) Prior Publication Data

US 2005/0027944 A1 Feb. 3, 2005

Related U.S. Application Data

(63) Continuation-in-part of application No. 10/630,542, filed on Jul. 29, 2003, now Pat. No. 7,373,642.

(51) Int. Cl.
*G06F 12/00* (2006.01)
(52) U.S. Cl. ....................................................... 711/201
(58) Field of Classification Search ................... 711/201
See application file for complete search history.

(56) References Cited

U.S. PATENT DOCUMENTS

| 4,635,261 A | 1/1987 | Anderson et al. |
| 4,766,569 A | 8/1988 | Turner et al. |
| 4,766,659 A | 8/1988 | Cronenwett et al. |
| 4,783,738 A | 11/1988 | Li et al. |
| 4,893,311 A | 1/1990 | Hunter et al. |
| 5,055,997 A | 10/1991 | Sluijter et al. |

(Continued)

FOREIGN PATENT DOCUMENTS

EP 0 507 507 7/1992

(Continued)

OTHER PUBLICATIONS

Hennessy et al., Computer Organization and Design: The Hardware/Software Interface, Morgan Kaufmann Publishers, Inc., 1998, p. 345.*

(Continued)

*Primary Examiner*—Matt Kim  
*Assistant Examiner*—Shane M. Thomas  
(74) *Attorney, Agent, or Firm*—Carr & Ferrell LLP

(57) ABSTRACT

A system and method provide unaligned load/store functionality for a processor that supports only aligned load/store instructions. An exemplary embodiment includes an extension adapter including registers for storing data and load/store buffers for realigning data. A processor executes aligned load/store instructions that transfer data in multiples of bytes. Instructions are included for transferring data between memory and the load/store buffers, initializing and transferring data, initializing and transferring data in numbers of bits, advancing or offsetting a data pointer, and for flushing the load/store buffers. In a preferred embodiment, the extension adapter comprises a wide register file for buffering full words of data, load/store buffers formed from multiple single-bit registers for buffering data bits and streaming data for use by the processor, and address generators for pointing to data or memory addresses.

8 Claims, 9 Drawing Sheets

U.S. PATENT DOCUMENTS

| | | | |
|---|---|---|---|
| 5,258,668 A | 11/1993 | Cliff et al. | |
| 5,260,610 A | 11/1993 | Pedersen et al. | |
| 5,260,611 A | 11/1993 | Cliff et al. | |
| 5,274,581 A | 12/1993 | Cliff et al. | |
| 5,274,782 A | 12/1993 | Chalasani et al. | |
| 5,299,317 A | 3/1994 | Chen et al. | |
| 5,343,406 A | 8/1994 | Freeman et al. | |
| 5,357,152 A | 10/1994 | Jennings, III | |
| 5,361,373 A | 11/1994 | Gilson | |
| 5,414,377 A | 5/1995 | Freidin | |
| 5,426,378 A | 6/1995 | Ong | |
| 5,436,574 A | 7/1995 | Veenstra | |
| 5,471,628 A | 11/1995 | Phillips et al. | |
| 5,488,612 A | 1/1996 | Heybruck | |
| 5,517,627 A * | 5/1996 | Petersen | 710/316 |
| 5,535,406 A | 7/1996 | Kolchinsky | |
| 5,619,665 A * | 4/1997 | Emma | 712/208 |
| 5,636,224 A * | 6/1997 | Voith et al. | 714/701 |
| 5,652,875 A | 7/1997 | Taylor | |
| 5,682,493 A | 10/1997 | Yung et al. | |
| 5,684,980 A | 11/1997 | Casselman | |
| 5,696,956 A | 12/1997 | Razdan et al. | |
| 5,726,584 A | 3/1998 | Freidin | |
| 5,742,180 A | 4/1998 | DeHon et al. | |
| 5,784,636 A | 7/1998 | Rupp | |
| 5,819,064 A | 10/1998 | Razdan et al. | |
| 5,822,588 A | 10/1998 | Sterling et al. | |
| 5,828,835 A | 10/1998 | Isfeld et al. | |
| 5,847,578 A | 12/1998 | Noakes et al. | |
| 5,850,564 A | 12/1998 | Ting et al. | |
| 5,920,202 A | 7/1999 | Young et al. | |
| 5,926,036 A | 7/1999 | Cliff et al. | |
| 5,943,150 A | 8/1999 | Deri et al. | |
| 5,956,518 A | 9/1999 | DeHon et al. | |
| 5,963,050 A | 10/1999 | Young et al. | |
| 5,977,793 A | 11/1999 | Reddy et al. | |
| 5,982,195 A | 11/1999 | Cliff et al. | |
| 5,986,465 A | 11/1999 | Mendel | |
| 5,999,734 A | 12/1999 | Willis et al. | |
| 6,026,478 A | 2/2000 | Dowling | |
| 6,092,174 A | 7/2000 | Roussakov | |
| 6,167,502 A | 12/2000 | Pechanek et al. | |
| 6,219,628 B1 | 4/2001 | Kodosky et al. | |
| 6,237,079 B1 | 5/2001 | Stoney | |
| 6,292,388 B1 | 9/2001 | Camarota | |
| 6,343,337 B1 | 1/2002 | Dubey et al. | |
| 6,353,841 B1 | 3/2002 | Marshall et al. | |
| 6,374,403 B1 | 4/2002 | Darte et al. | |
| 6,415,424 B1 | 7/2002 | Arimilli et al. | |
| 6,418,045 B2 | 7/2002 | Camarota | |
| 6,426,648 B1 | 7/2002 | Rupp | |
| 6,467,009 B1 | 10/2002 | Winegarden et al. | |
| 6,505,241 B2 | 1/2003 | Pitts | |
| 6,557,092 B1 | 4/2003 | Callen | |
| 6,622,233 B1 | 9/2003 | Gilson | |
| 6,633,181 B1 | 10/2003 | Rupp | |
| 6,698,015 B1 | 2/2004 | Moberg et al. | |
| 6,721,884 B1 | 4/2004 | De Oliveira Kastrup Pereira et al. | |
| 6,732,354 B2 | 5/2004 | Ebeling et al. | |
| 6,744,274 B1 | 6/2004 | Arnold et al. | |
| 6,795,900 B1 | 9/2004 | Miller et al. | |
| 6,799,236 B1 | 9/2004 | Dice et al. | |
| 6,817,013 B2 | 11/2004 | Tabata et al. | |
| 6,831,690 B1 | 12/2004 | John et al. | |
| 6,857,110 B1 | 2/2005 | Rupp et al. | |
| 6,874,110 B1 | 3/2005 | Camarota | |
| 6,883,084 B1 | 4/2005 | Donohoe | |
| 6,954,845 B2 | 10/2005 | Arnold et al. | |
| 6,968,544 B1 | 11/2005 | Schneider | |
| 6,986,127 B1 | 1/2006 | Newlin et al. | |
| 6,996,709 B2 | 2/2006 | Arnold et al. | |
| 7,000,211 B2 | 2/2006 | Arnold | |
| 7,062,520 B2 | 6/2006 | Rupp | |
| 7,086,047 B1 | 8/2006 | Edwards et al. | |
| 7,178,062 B1 | 2/2007 | Dice | |
| 7,254,142 B2 | 8/2007 | Hagsand et al. | |
| 2001/0049816 A1 | 12/2001 | Rupp | |
| 2003/0046513 A1 | 3/2003 | Furuta et al. | |
| 2003/0097546 A1 | 5/2003 | Taylor | |
| 2003/0108119 A1 | 6/2003 | Mohebbi et al. | |
| 2003/0120889 A1 * | 6/2003 | Roussel et al. | 711/201 |
| 2003/0196058 A1 * | 10/2003 | Ramagopal et al. | 711/169 |
| 2004/0019765 A1 | 1/2004 | Klein, Jr. | |
| 2004/0186872 A1 | 9/2004 | Rupp | |
| 2004/0193852 A1 | 9/2004 | Johnson | |
| 2004/0208602 A1 | 10/2004 | Plante | |
| 2005/0027970 A1 | 2/2005 | Arnold et al. | |
| 2005/0027971 A1 | 2/2005 | Williams et al. | |
| 2005/0166038 A1 | 7/2005 | Wang et al. | |
| 2005/0268271 A1 | 12/2005 | Gutberlet et al. | |

FOREIGN PATENT DOCUMENTS

| | | |
|---|---|---|
| EP | 0 668 659 | 8/1995 |
| EP | 1 443 417 | 8/2004 |
| TW | 478252 | 3/2002 |
| TW | 480818 | 3/2002 |
| TW | 152355 | 7/2002 |
| TW | 152994 | 7/2002 |
| TW | 509798 | 11/2002 |
| TW | 168210 | 4/2003 |

OTHER PUBLICATIONS

Tanenbaum, "Modern Operating Systems," Prentice Hall, 2001, pp. 31.*

Bechade, R.A. et al., "Programmable Arithmetic/Logic Circuits," IBM Technical Disclosure Bulletin, U.S. IBM Corp., New York, vol. 3, No. 11, Apr. 1981, pp. 4870-4873, XP-000713711.

Beeck et al., "CRISP: A Template for Reconfigurable Instruction Set Processors," FPL 2001, LNCS 2147, pp. 296-305, Springer-Verlag Berlin Heidelberg, 2001.

U.S. Appl. No. 10/630,542, Kenneth Williams, Defining Instruction Extensions in a Standard Programming Language, filed Jul. 29, 2003.

U.S. Appl. No. 10/404,706, Scott D. Johnson, Extension Adapter, filed Mar. 31, 2003.

U.S. Appl. No. 10/394,824, Charle' Rupp, Transitive Processing Unit for Performing Complex Operations, filed Mar. 21, 2003.

U.S. Appl. No. 10/750,714, Ricardo Gonzalez, Systems and Methods for Software Extensible Multi-Processing, filed Dec. 31, 2003.

U.S. Appl. No. 10/815,453, Ricardo Gonzalez, Configuring a Multi-Processor System, filed Mar. 31, 2004.

U.S. Appl. No. 11/021,247, Ricardo Gonzalez, Systems and Methods for Selecting Input/Output Configuration in an Integrated Circuit, filed Dec. 21, 2004.

U.S. Appl. No. 11/129,146, Ricardo Gonzalez, Long Instruction Word Processing with Instruction Extensions, filed May 12, 2005.

U.S. Appl. No. 11/099,280, Jeffrey M. Arnold, Video Processing System with Reconfigurable Instructions, filed Apr. 4, 2005.

U.S. Appl. No. 11/204,555, Jeffrey M. Arnold, Programmable Logic Configuration for Instruction Extensions, filed Aug. 15, 2005.

Intel and Hewlett-Packard, "IA-64 Application Instruction Set Architecture Guide," Revision 1.0, 1999, pp. C-1 through C.

Dehon, Andre, "Transit Note #118 Notes on Coupling Processors with Reconfigurable Logic," M.I.T. Transit Project, Last Updated Mar. 21, 1995.

Hwang, Kai, "Advanced Computer Architecture: Parallelism, Scalability, Programmability," 1993, McGraw Hill, pp. 182-183.

Ye, Z.A. et al., "Chimaera: a high-performance architecture with a tightly-coupled reconfigurable functional unit," Jun. 10-14, 2000, Proc. of the 27th International Symposium on Computer Architecture, pp. 225-235.

Goldblatt, Kim, "The Low-Cost, Efficient Serial Configuration of Spartan FPGAs," Nov. 13, 1998, XAPP098 (Version 1.0), XILINX.

Golestani, S. Jamaloddin, "A Sto-and-Go Queuing Framework for Congestion Management," 1990, Proc. of the ACM Symposium on Communications Architectures & Protocols, ACM Press, New York, NY, pp. 8-18.

Dally, William J. and Charles L. Seitz, "Deadlock Free Message Routing in Multiprocessor Interconnection Networks," May 10, 1985, Computer Science Department, California Institute of Technology.

MIPS Technologies, Inc., "MIPS Extension for Digital Media with 3D," 1996, pp. 1-26.

Borgatti, Michele et al., "A Reconfigurable System featuring Dynamically Extensible Embedded Microprocessor, FPGA and Customisable I/O," 2002, IEEE Custom Integrated Circuits Conference, pp. 1-4.

Razdan, Rahul and Michael D. Smith, "A High-Performance Michroarchitecture with Hardware-Programmable Functional Units," Nov. 1994, Proc. of MICRO-27, pp. 1-9.

Francisco Barat, et. al., "Reconfigurable Instruction Set Processors: A Survey," IEEE 2000.

Shekhar Borkar et al., "iWarp: An Integrated Solution to High-Speed Parallel Computing," IEEE 1988.

Pedro Diniz, et al. "Automatic Synthesis of Data Storage and Control Structures for FPGA-based Computing Engines," 2000 IEEE, pp. 91-100.

Ricardo E. Gonzales, "XTENSA: A Configurable and Extensible Processor," Mar.-Apr. 2000, IEEE Micro, pp. 60-70.

Michael Bedford Taylor et al., "The Raw Microprocessor: A Computational Fabric for Software Circuits and General-Purpose Programs," Mar.-Apr. 2002, IEEE Micro, pp. 25-35.

Elliot Waingold et al., "Baring it All to Software: Raw Machines," Computer, Sep. 1997, 1997 IEEE, pp. 86-93.

U.S. Appl. No. 10/746,018, filed Dec. 23, 2003, Rupp et al.

Golestani, S.J., "A Stop-and-Go Queuing Framework for Congestion Management," Aplications, Technologies, Architectures, and Protocols for Computer Communication, Proceedings of the ACM Symposium on Communications Architectures & Protocols, 1990, ACM Press, New York, NY USA.

* cited by examiner

INSTRUCTION SET FOR EFFICIENT BIT STREAM AND BYTE STREAM I/O

CROSS-REFERENCE TO RELATED APPLICATIONS

This application is a continuation-in-part of U.S. application Ser. No. 10/630,542 filed on Jul. 29, 2003 now U.S. Pat. No. 7,373,642 and titled "Defining Instruction Extensions in a Standard Programming Language" which is incorporated herein by reference.

REFERENCE TO COMPUTER PROGRAM LISTING APPENDIX

A computer program listing in Appendix A on compact disc CD-R media and duplicate CD-R media includes the text file "tobruce.tie" of size 40 kilobytes, created Oct. 13, 2003; the entire teachings inherent therein are incorporated herein by reference. Two compact discs containing identical material, labeled "Copy 1" and "Copy 2," are included herewith in accordance with 37 CFR §1.52 and §1.96. The software encoded on the compact disc is subject to copyright protection. The copyright owner has no objection to the facsimile reproduction of the patent document or patent disclosure as it appears in the U.S. Patent and Trademark Office patent file or records, but otherwise reserves all copyright rights whatsoever.

BACKGROUND OF THE INVENTION

1. Field of the Invention

The present invention relates generally to the field of programmable computer processors, and more particularly to application specific instruction sets.

2. Description of the Prior Art

Load and store instructions are a mechanism by which processors read data from and write data to memory or cache. Memories in computer processing systems have a fixed word width, but a data element to be stored in the memory often is different in width than the memory word width. For example, a 24-bit data element might be stored in a memory having 32-bit words, leaving eight bits of unused memory capacity. Therefore, a data element that is not aligned within the memory wastes memory capacity and may require multiple memory accesses to process. Alternatively, a processor may operate on multiple smaller elements at once, such as two sequential 16-bit elements, which may necessitate accessing some bytes from one memory word and the rest from the next memory word.

Load/store instructions can be segregated into aligned and unaligned types. With aligned load/store, a processor reads from memory in multi-byte 'chunks' beginning at addresses that are multiples of the 'chunk' size. For example, aligned loading of a 128-bit word requires loading sixteen 8-bit bytes with an address that is a multiple of sixteen. Aligned instructions require a relatively uncomplicated hardware structure, thus most processors support aligned load/store. Aligned data never presents the problem of accessing multiple words.

Unaligned load/store instructions do not necessarily load data into memory from aligned addresses. Unaligned instructions are relatively easier to use in programming due to reduced memory allocation restrictions and addressing limitations. Unaligned instructions are advantageous for algorithms that process data elements smaller than the memory word size since data elements can be densely packed into memory and more than one data element can be accessed at a time. However, most processors do not support unaligned load/store instructions because unaligned load/store instructions are relatively more complicated to implement with silicon hardware.

Unaligned memory accesses can cross memory boundaries, requiring access from multiple words, and can require accessing partial words. Some implementations for processing unaligned data perform sequential accesses to process a data element that spans multiple data words, but this takes more than one memory cycle. Memory accesses to misaligned addresses can be emulated by multiple aligned accesses, but this method is slow. Attempting to perform an unaligned memory access in a system that does not support it may generate 'bus errors' or may abort the program.

Accordingly, a method is needed to provide unaligned load/store instructions for a processor that normally supports only aligned load/store instructions.

BRIEF SUMMARY

The present invention is directed to a system and method that provides unaligned load/store instructions for a processor that normally supports only aligned load/store instructions. In a method of unaligned memory read instructions in accordance with the invention, loading an aligned word from memory initializes a load/store buffer. A second word further initializes the load/store buffer. One or more data sequences are read from the load/store buffer, such that the total lengths of the sequences that are read do no exceed the length of a memory word. As data is read, additional aligned memory words are loaded into the load/store buffer to replace data that has been read. The processor of one embodiment has an extensible instruction set, however, in another embodiment the processor is a general-purpose processor. In one embodiment, the data sequences are read in multiples of bytes, and other embodiments read data in multiples of bits. Instructions of one embodiment specify the number of data sequences to be read as an immediate number, where other embodiments specify the number of data sequences to read as an index stored in a register. Further embodiments allow a double indexed instruction, with one value specifying a number of sequences to read and a second value that specifies how far to move an address pointer. In one embodiment in accordance with the method of the invention, reading a first and second data word represents reading adjacent memory locations and either incrementing or decrementing a memory address pointer.

In a method of unaligned memory store instructions in accordance with the invention, a load/store buffer is first initialized with one or more unaligned data sequences. Additional unaligned data sequences are loaded into the initialized load/store buffer, such that the written unaligned data shifts an aligned word into a memory location. Flushing the load/store buffer then stores any remaining unaligned data into memory. In one embodiment, the data sequences are read in multiples of bytes, and other embodiments read data in multiples of bits. In one embodiment in accordance with the method of the invention, loading a first and second data word represents loading adjacent memory locations and either incrementing or decrementing a memory address pointer to point to the second word.

A further understanding of the nature and advantages of the inventions herein may be realized by reference to the remaining portions of the specification and the attached drawings.

DETAILED DESCRIPTION OF THE INVENTION

The present invention provides a system and method for a processor instruction set that includes unaligned load/store instructions. As general purpose processors typically do not have programmable instruction sets, the present invention will be described with reference to the programmable processing hardware of FIG. 1, though it will be appreciated that the invention is not so limited and can be used in conjunction with other suitable programmable processing hardware, including non-extensible processors.

Figure 1:
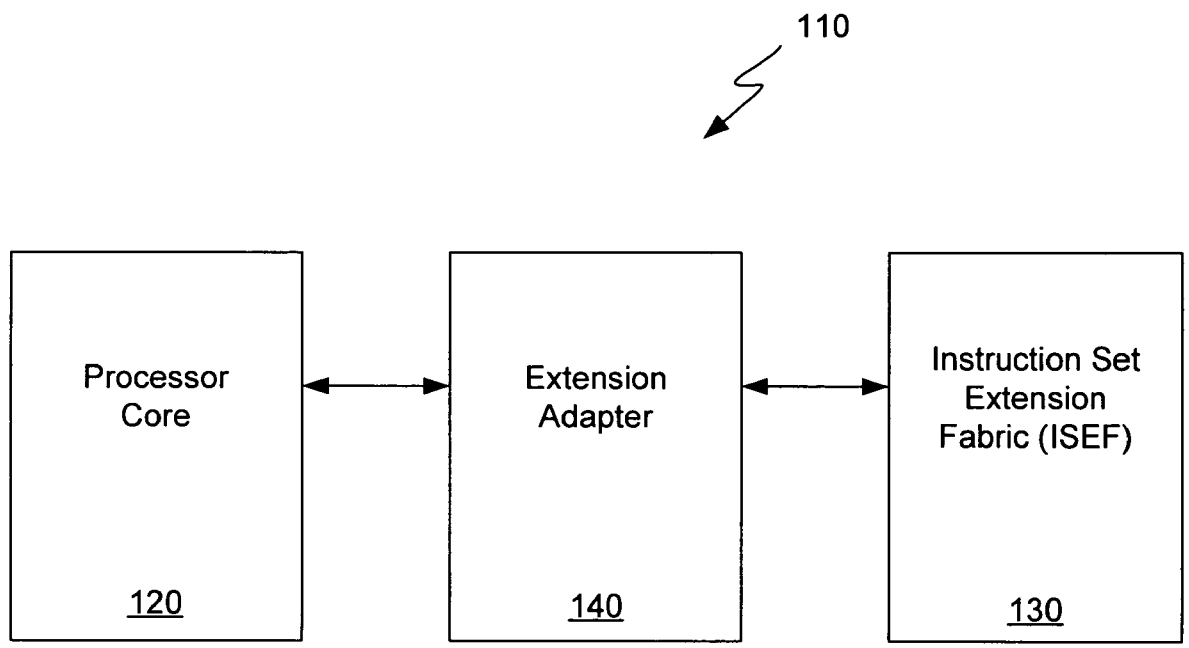
FIG. 1 is a schematic diagram of an exemplary extensible processor system of the present invention.

FIG. 1 is a schematic drawing of an exemplary programmable processing system 110 including a processor core 120, an Instruction Set Extension Fabric (ISEF) 130, and an extension adapter 140 that couples the ISEF 130 to the processor core 120. The processor core 120 can include optional features such as additional coprocessors, write buffers, exception handling features, debug handling features, read only memory (ROM), etc. The processor core 120 provides standard processing capabilities such as a standard (native) instruction set that provides a set of instructions that the processor core 120 is designed to recognize and execute. Typical instructions include arithmetic functions such as add, subtract, and multiply, as well as load instructions, store instructions, and so forth. These instructions are hard-coded into the silicon and cannot be modified. One example of a suitable processor core 120 is the Xtensa® V (T1050) processor, from Tensilica, Inc., of Santa Clara, Calif.

Instruction Set Extension Fabric (ISEF) 130 includes programmable logic for enabling application-specific instructions ("instruction extensions") to be stored and executed. Because it is programmable, the instruction set of ISEF 130 can be readily configured to include instruction extensions that are tailored to a specific application. In some embodiments the ISEF 130 runs at a slower clock speed than processor core 120. In these embodiments the cycle length of the ISEF 130 can be a multiple of the clock cycle of the processor core 120.

Extension adapter 140 provides an interface between the ISEF 130 and the processor core 120. Extension adapter 140 receives instructions and determines whether the instructions should be directed to the ISEF 130 or the processor core 120. In some embodiments extension adapter 140 provides an interface between a plurality of ISEF's 130 and processor cores 120. Extension adapter 140 can be implemented, for example, in Application Specific Integrated Circuit (ASIC) logic.

Extension adapter 140 in combination with ISEF 130 provides logic that allows users to extend the native instruction set defined by the processor core 120. It is noteworthy that the instruction execution itself is implemented in one or more of ISEF 130. Extension adapter 140 interfaces one or more ISEF 130 to processor core 120 and controls dataflow.

Figure 2:
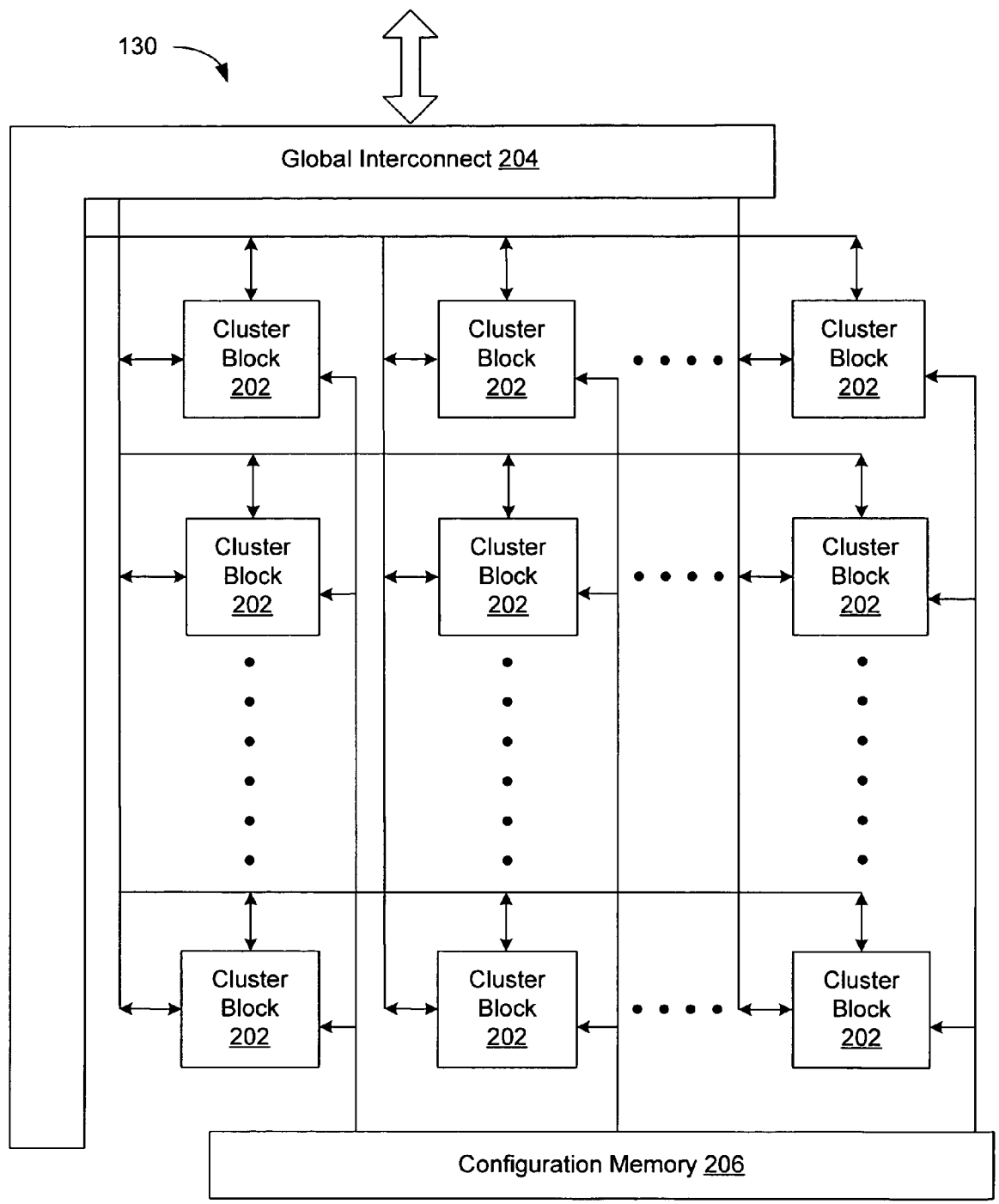
FIG. 2 is a schematic diagram of the Instruction Set Extension Fabric (ISEF) in accordance with the schematic of FIG. 1.

FIG. 2 illustrates one embodiment of an ISEF 130. As shown, ISEF 130 includes a plurality of cluster blocks 202 arranged in rows and columns. Data is communicated between cluster blocks 202 by means of a global interconnect 204. As shown, the global interconnect 204 also communicates data and dynamic configuration information used or output by ISEF 130 with other devices including extension adapter 140, which data and dynamic configuration information will be described in more detail below. Although generically shown as permitting any two cluster blocks 202 in ISEF 130 to communicate directly with each other via global interconnect 204, such interconnections need not be so limited. For example, cluster blocks 202 can additionally or alternatively have interconnections such that blocks in adjacent rows and/or columns communicate directly with each other.

Although not necessarily part of ISEF 130, and preferably separately provided, also shown is configuration memory 206. Configuration memory 206 stores static configurations for ISEF 130. The term "memory" is not intended to be construed as limiting. Rather, configuration memory 206 can have various implementations including CMOS static random access memory (SRAM), fused links and slow speed electrically erasable read only memory (EEPROM).

Figure 3:
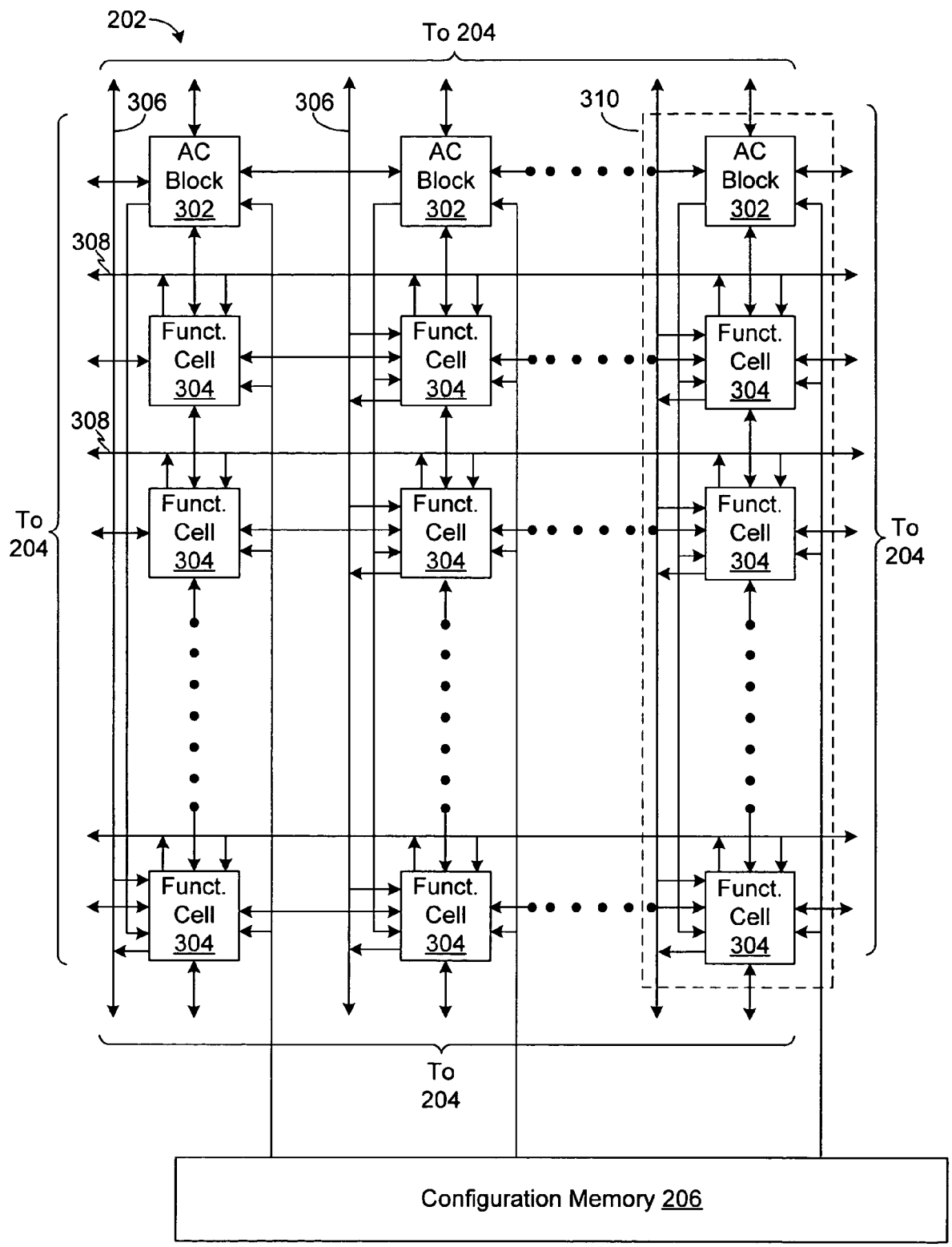
FIG. 3 illustrates an example of the cluster block implementation illustrated in FIG. 2.

FIG. 3 illustrates a cluster block arrangement that can be used to implement cluster block 202 in FIG. 2. As shown, it includes a plurality of ALU controller (AC) blocks 302 and function cells 304. The AC blocks 302 provide configuration signals for a respective column 310 of function cells 304. In one example of the invention, cluster block 202 includes four columns of four function cells 304, each column including one AC block 302.

FIG. 3 shows paths for sharing data and dynamic configuration information between vertically or horizontally adjacent function cells 304 within cluster block 202, and with other cluster blocks via global interconnect 204. Also shown are horizontal word lines 308 and vertical word lines 306, by which certain or all of the interior function cells 304 may communicate data with other cluster blocks 202, which word lines partially implement global interconnect 204.

ISEF 130 is described in more detail in U.S. Patent Publication Number US 2001/0049816, which is incorporated herein by reference. A suitable ISEF 130 is available from Stretch, Inc., of Mountain View, Calif.

Figure 4:
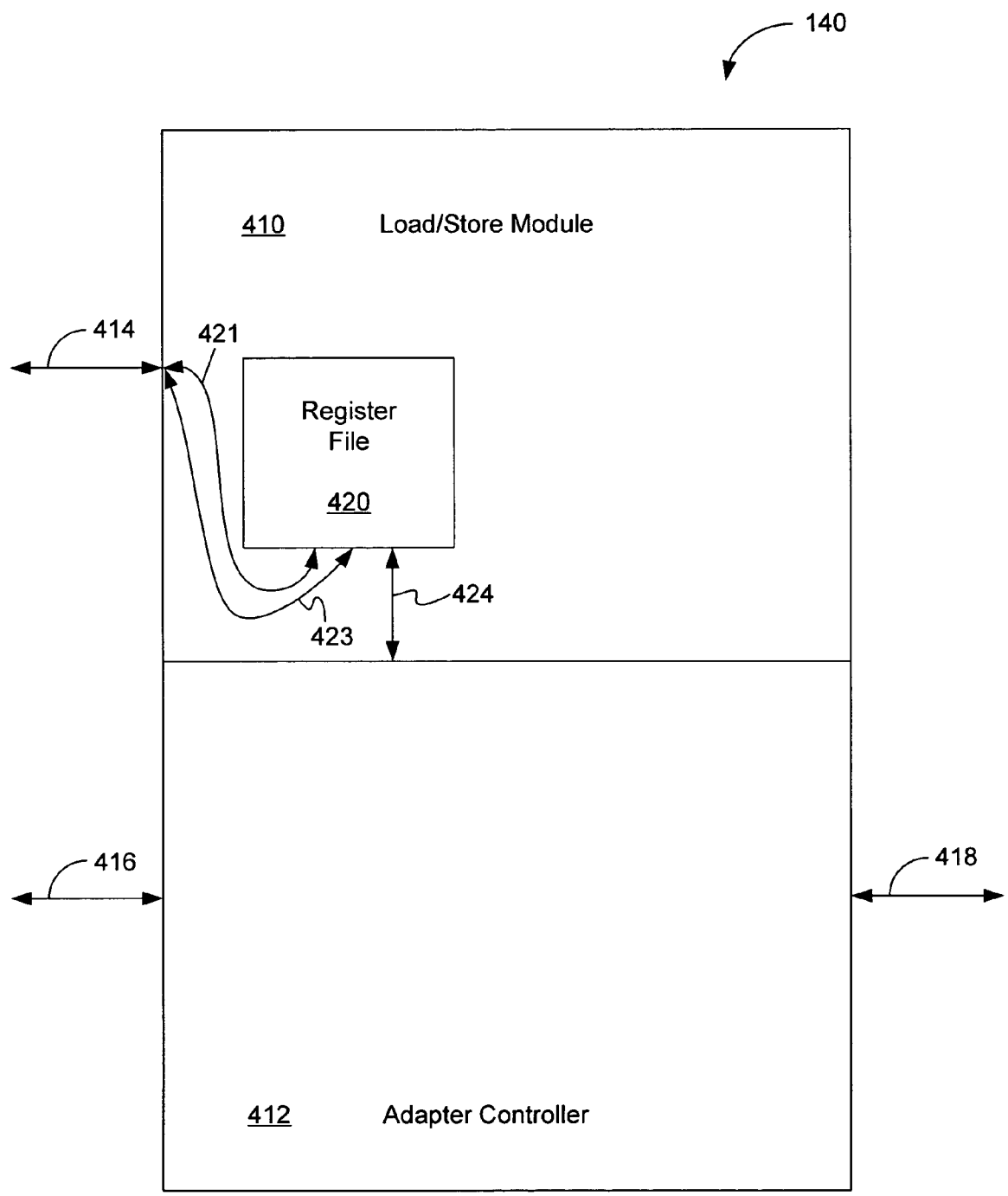
FIG. 4 is a schematic diagram illustrating details of the extension adapter of FIG. 1, in accordance with an embodiment of the present invention.

Referring to FIG. 4, extension adapter 140 is shown in greater detail. In one embodiment, extension adapter 140 comprises load/store module 410 and adapter controller 412. In another embodiment, processor core 120, and not extension adapter 140, comprises load/store module 410.

Load/store module 410 is created via a compiler, such as, for example, the Tensilica Instruction Extension (TIE) compiler, which can be obtained from Tensilica, Inc., of Santa Clara, Calif. TIE is a language that allows a user to describe the functionality of new extended instructions. A designer uses TIE to create a standard set of functions that extend the normal functionality of processor core 120. The TIE code that a designer writes describes the functionality of a series of resources that aid in the interface between processor core 120 and extension adapter 140. Users can therefore add new instructions pre-silicon. Extension adapter 140 functions such that processor core 120 treats user-defined post-silicon, extended instructions as if they were native instructions to the processor core 120.

Load/store module 410 interfaces with processor core 120 via interface 414. Register file 420 is coupled to interface 414 via processor control and data interface 421 and via ISEF control and data interface 423. Adapter controller 412 interfaces with processor core 120 via interface 416. Adapter controller 412 interfaces with ISEF 130 via interface 418.

In an exemplary embodiment according to the present invention, load/store module 410 comprises register file 420. Register file 420 is a register file, or collections of registers, that is added by using, for example, the TIE compiler. Register file 420 interfaces with adapter controller 412 via interface 424. In one embodiment, register file 420 is 128 bits wide. In another embodiment, register file 420 is 64 bits wide. However, register file 420 can be of varying widths. It is contemplated that the system can comprise one or more than one register file 420. Adapter controller 412 accesses register file 420. Adapter controller 412 is then used to interface with ISEF 130.

Load/store module 410 provides fixed instruction functionality. A set of fixed instructions includes instructions for moving data to and from external memory (not shown), into and out of register file 420. This collection of functionality is defined in one embodiment in the TIE language, and is implemented through Tensilica's TIE compiler. It is contemplated that languages other than TIE can be used with the present system. Load/store module 410 contains one or more register files 420 and a set of fixed instructions that give register files 420 access to external memory via load and store instructions. Again, these instructions will be fixed once the silicon is created, and are fully implemented using the standard TIE flow. It is a function of the extension adapter 140 to encapsulate the fixed functionality and manage it with the configurable interface logic.

A purpose of load/store module 410 includes declaring the functionality of register file 420, which is basically temporary storage for data that is going to end up being transferred from processor core 120 to ISEF 130. Load/store module 410 defines not only register file 420, but also defines how to load and store generic instructions (e.g., Tensilica instructions) of processor core 120 into register file 420. Adapter controller 412 performs the function of interfacing with register file 420. Adapter controller 412 also operates on the data from register file 420 and interfaces register file 420 with ISEF 130.

In one exemplary methodology, standard load and store instructions are used to move data to and from register file 420. Load instructions issued by the extension adapter 140 retrieve data from memory into register file 420. ISEF 130 instructions operate under the control of extension adapter 140 to retrieve stored data from register file 420 to ISEF 130 for use in ISEF 130 computations or other functional execution. Data resulting from ISEF 130 instruction execution is then returned to register file 420, where store instructions move data from register file 420 to memory via interface 414.

ISEF 130 and adapter controller 412 allow a user to add new instructions that change with software on different implementations of the same silicon. For example, a user can add specialized instructions to perform video or audio encoding/decoding. These instructions are not hard-wired into processor core 120, but rather are implemented using the programmably configurable logic of ISEF 130. Extension adapter 140 operates as a data and control interface between processor core 120 and ISEF 130 by routing extended instructions (i.e., those instructions not part of the original processor core 120 native instruction set) to ISEF 130 for execution. Since the logic of ISEF 130 is configurable, it is entirely within the scope of the present invention that the configuration of ISEF 130 can be changed as frequently as needed to accommodate the inclusion of various extended instructions in application programs being run on the processor core 120.

In one embodiment of the present invention, the inputs and outputs to the extended instruction, as executed in ISEF 130, are limited to data transfers between register file 420 or some equivalent special purpose register (processor states) location. In such an embodiment, the number of register file 420 inputs to the ISEF 130 computation is limited to a finite number such as three (3), and the number of special purpose register inputs is eight (8) 128-bit registers. The outputs of the ISEF 130 computations are directed to register file 420, to equivalent special purpose register, and/or by-passed to processor core 120 for use in execution of the subsequent instruction. In the above embodiment, the number of register file 420 outputs is two (2) and the number of 128-bit, special purpose register outputs is up to eight (8). The extended instruction of the present invention of such an embodiment does not have direct access to data and instruction memories and caches of the processor core 120. Any data residing in the data and instruction memories or caches of processor core 120 must first be brought into the register file 420 or equivalent special purpose registers using load instructions, before being used by the extended instruction as executed in ISEF 130. Such a restriction in the I/O of the extended instruction of this embodiment enables compiler optimization and improved performance. The exact input and output dependencies of the extended instructions are programmed into the C compiler (discussed with reference to FIG. 7) used in scheduling the extended instruction and in allocating the associated register files 420.

It is noteworthy that extension adapter 140 handles the multiplexing of data among register file(s) 420 and ISEF 130. Extension adapter 140 manages the timing relationships between register reads and register writes, which are functions of instruction execution length.

It is also noteworthy that the processing system 110 comprises means for ensuring the proper configuration of ISEF 130 prior to the execution of a specific extended instruction in the ISEF 130. In one example, if the system tries to execute an instruction not included in the instruction set of processor core 120 that has yet to be configured in ISEF 130, an exception is generated by the extension adapter 140, resulting in either the proper configuration signals being sent to ISEF 130, or in an alternative process, being initiated to deal with the missing configuration.

Figure 5:
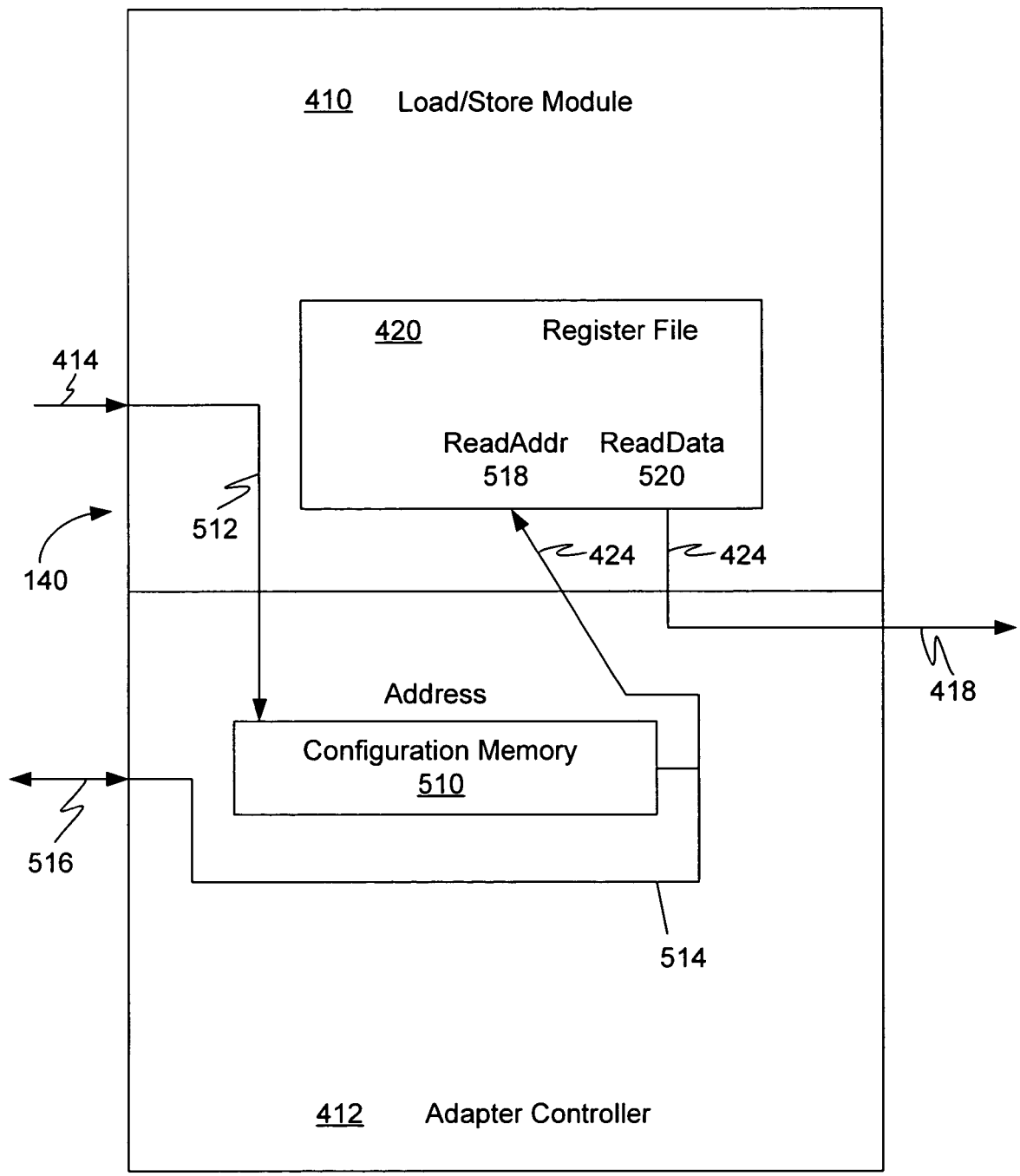
FIG. 5 is a schematic diagram illustrating an operation involving the reading of data in accordance with the extension adapter of FIG. 4.

In keeping with some embodiments according to the present invention, FIG. 5 illustrates an operation involving the reading of data. Configuration memory 510 has a description of what user instructions are adapted to do with respect to the interface to processor core 120. For any instruction that a user creates, those instructions should control processor core 120 in such a way that processor core 120 executes those instructions in similar fashion to native instructions included in the original processor core 120 instruction set. Configuration memory 510 receives instruction description data 512 (from interface 414 of FIG. 4) as a sequence of binary numbers (e.g., a 24-bit sequence) that is decoded by configuration memory 510 and converted into an address that points to a location in configuration memory 510.

If the instruction description data 512 describes a normal add, subtract, etc. contained in the native instruction set of processor core 120, then configuration memory 510 does not do anything with the instruction. However, if the instruction description data 512 describes an extended instruction that ISEF 130 is to execute, then configuration memory 510 returns configuration information 514 back to processor core 120 to indicate this is a valid instruction. Extension adapter 140 will thereafter operate on the extended instruction in cooperation with ISEF 130 so that to processor core 120 it appears that the extended instruction is identical in form to a native instruction of processor core 120.

Configuration information 514 is a sequence of data from configuration memory 510, some of which goes to processor core 120 via interface 516. Some of configuration information 514 is transmitted to the ReadAddr 518 (read address) input of register file 420 via interface 424. Data from Read-Data 520 (read data) of register file 220 is also carried on interface 424. In this example, configuration information 514 includes the address within register file 420 that an extended instruction needs to be sent to ISEF 130 via interface 418.

Figure 6:
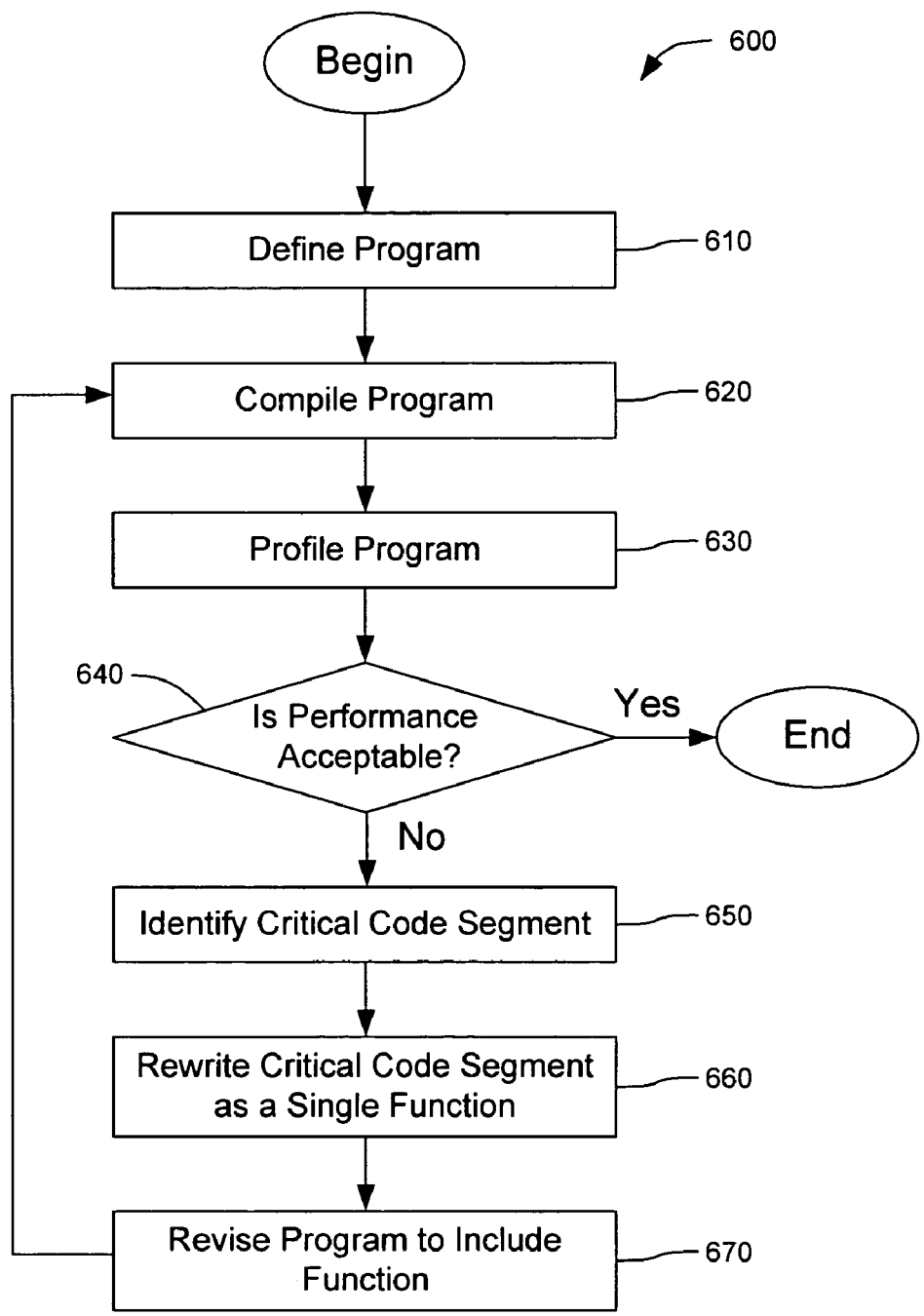
FIG. 6 is a flow chart illustrating a preferred method of the present invention.

FIG. 6 is a flow chart illustrating an exemplary embodiment 600 of the method of the invention. The method begins by defining a program in step 610. The program can be defined in a standard programming language that is familiar to computer programmers such as C++.

Thereafter, in step 620, the program is compiled to convert the program from the programming language in which it was written into a machine language that is recognizable by the processor core 120 (FIG. 1). It will be appreciated that the present method is intended to be iterative, as can be seen from FIG. 6, and that successive iterations initially return to step 620. Whereas in the first pass through step 620 a standard compiler, such as C++ compiler, compiles the program, in successive iterations an additional extension compiler is also employed, as is discussed elsewhere herein.

Next, in step 630 the compiled program is profiled. Profiling includes executing the compiled program and determining how much time would be expended executing each of the various operations of the program. Profiling in step 630 is preferably performed using a software simulation tool (not shown) that mimics the operation of the processor core 120. Such processor simulators are well known in the art, and each simulator is unique to the processor core 120 being simulated. Alternatively, profiling 630 can occur using a hardware emulator (not shown) or some combination of hardware and software. Hardware emulation is particularly useful in applications where specific timing issues are of concern to the designer.

As in step 620, because the method is iterative, the first pass through step 630 is different than in successive iterations. In the first pass through step 630 the compiled program is executed or simulated solely on the processor core 120 to provide a baseline against which improvements in successive iterations can be measured. It should be noted that some of the more time consuming operations that are typically identified by profiling involve nested loops.

In step 640 a determination is made as to the acceptability of the performance of the program. If the performance is acceptable then the method ends. Otherwise, the method continues to step 650. Generally, in the first pass through step 640 the performance will not be acceptable since no effort has yet been made to optimize the program. In successive iterations, performance can be judged against either subjective or objective standards. In some instances the program needs to be optimized so that it can return data according to the timing requirements of other programs with which it interfaces. In other instances merely a faster processing speed is desired from the program. In these latter instances, at each iteration the performance is compared to the performance from the prior iteration to determine whether the most recent iteration returned a further improvement. If no further improvement is achieved by a successive iteration, or if the improvement is sufficiently trivial, the performance is deemed to be acceptable and the method ends.

In step 650 one or more critical code segments are identified by reviewing the results of the profiling performed in step 630. A critical code segment is a portion of the program's code that took excessive time to execute in step 630. Typically, those code segments that took the longest time to execute are considered to be the most critical and are addressed first by the method. As noted elsewhere, nested loops are frequently identified as critical code segments. If addressing the most critical code segments does not produce acceptable performance in step 640, then in successive iterations the next most critical code segments are identified in step 650.

Next, in step 660, the critical code segment identified in step 650 is preferably rewritten as a separate function. An example is illustrative of this process. The following original code segment includes a nested loop as the critical code segment:

```
a = 0
for (i = 0; i < 100; i ++)
        {for (j = 0; j < 8; j ++)
                {a += x[i + j] * y[j];}
        z[i] = a >> k;}
```

The critical code segment can be rewritten as a function, which in the following example is given the name "inner":

```
int inner (short*x, short*y)
        {for (j = 0; j < 8; j ++)
                {a += x[j] * y[j];}
        return a >> k;}
```

Advantageously, the function can be written using the same programming language as before. In some embodiments the function does not have to be written from scratch but can instead be selected from a class library (not shown) of pre-defined functions. A class library of pre-defined functions can include functions that might be particularly useful in a certain type of application, such as functions for working with pixel data in video processing applications.

In an alternative embodiment, step 660 markers (in C programming, such markers are conventionally referred to as PRAGMAS) are used to demark the beginning and ending of a section of code to be rewritten. Once identified, the demarked section of code is replaced by one, or alternatively, multiple instructions. It should be apparent to those of ordinary skill in the art that the rewriting step of 660 can be performed either manually, or by using an automated conversion tool. Such a conversion tool would be similar to a decompiler; rather than compiling a high level instruction into multiple lower level instructions as in a compiler, the automated conversion tool would convert multiple lower level instructions of the processor core 120 instruction set into or more complex extended instructions for implementation in ISEF 130.

Once the critical code segment has been rewritten as a function in step 660, in step 670 the program is revised. The revision includes two operations, designating the function as a code segment to be compiled by an extension compiler and replacing the critical code segment with a statement that calls the function. In some embodiments the function is placed into an extensions file, separate from the program file, that contains the code meant to be compiled by the extension compiler. In other embodiments the function is placed in the program file and demarked in such a way that it can be recognized as intended for the extension compiler so that the standard compiler will ignore it. Demarking the function in this way can be achieved by a flag before the instruction (e.g., # pragma stretch begin) and a flag after the function (e.g., # pragma stretch end).

As noted, revising the program also includes replacing the critical code segment with a statement that calls the function. Continuing with the prior example, the original code segment that includes the critical code segment can be rewritten by replacing the critical code segment with the statement {z[i] =inner (x+i, y);} as follows:

```
a = 0
for (i = 0; i < 100; i ++)
    {z[i] = inner (x + i, y);}
```

Once the program has been revised in step 670 the method returns to step 620 and the program is again compiled. In those embodiments in which the function has been placed in the program file and demarked from the remaining code, a pre-processing tool first finds the function and copies it out to an extensions file.

Figure 7:
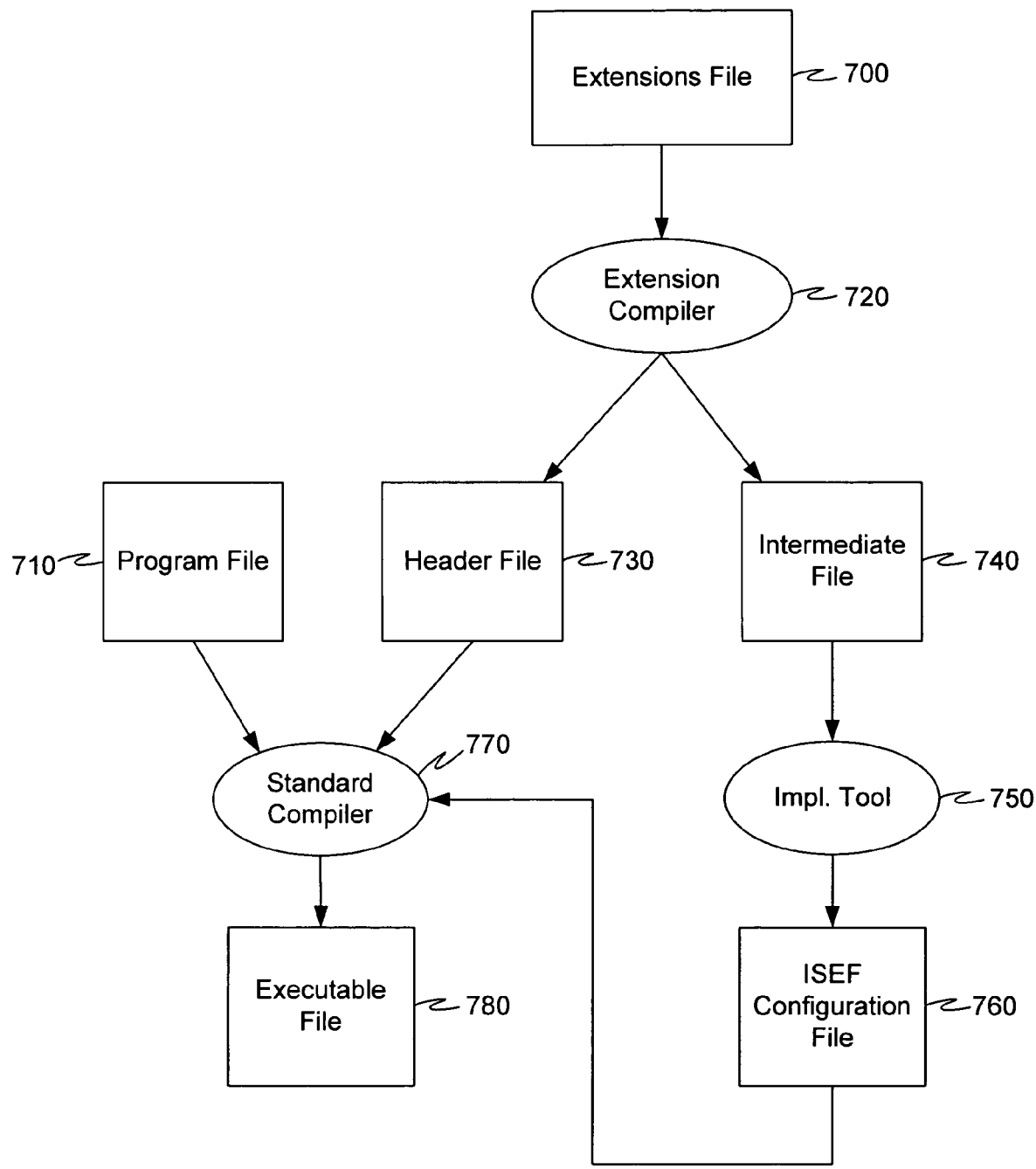
FIG. 7 is a flow chart further detailing the method of the invention illustrated in FIG. 6.

FIG. 7 illustrates an exemplary sequence of events that occurs during step 620 to compile an extensions file 700 and a program file 710. Initially, the code in the extensions file 700 is compiled by the extension compiler 720. An example of an extension compiler 720 is Stretch C, available from Stretch, Inc. of Mountain View, Calif. The extension compiler 720 produces two outputs: a header file 730 and an intermediate file 740 written in a hardware description language such as Verilog HDL. The header file 730 declares a prototype for a specific function used to execute an extended instruction called out by the extension compiler 720 during compilation of the extensions file 700. The header file 730 is a conventional C file that provides instruction information, such as the file name, inputs required, outputs written, and other required instruction parameters. The intermediate file 740 describes how to implement an instruction in the ISEF 130 that corresponds to the function. Next, an implementation tool 750 maps the intermediate file 740 to the ISEF 130. More specifically, the implementation tool 750 converts the contents of the intermediate file 740 to ISEF configuration file 760. Implementation tool 750 generates ISEF configuration file 760 consisting of a bit stream that is compiled with program file 710 and header file 730 in standard compiler 770 and incorporated in the executable file 780. This ISEF configuration file 760 contains the data that is used by the executable file 780 to configure ISEF 130 in much the same way that a Field Programmable Gate Array (FPGA) is programmed.

When the extension adapter 140 encounters a processor core 120 instruction that is not part of the native set, but is rather an extended instruction generated by extension compiler 720, the processor core 120 sends a configuration bit stream to the ISEF 130 to appropriately configure the ISEF 130 to execute the extended instruction. Thus, the executable file 780 can call the function and the programmable logic device 130 contains an instruction that can perform the function.

Thereafter, in step 630 the program is again profiled. In this and subsequent iterations of the method, in contrast to the first pass through step 630, the extension adapter 140 (FIG. 1) directs the ISEF 130 to execute the instruction corresponding to the function when the function is called as the executable file 780 runs. Accordingly, the program executes more efficiently, as will be represented by the profile. Next, in step 640 the performance is again evaluated, and if acceptable the method ends, otherwise it begins a new iteration at step 650.

Returning to step 660, a critical code segment can alternatively be rewritten by selecting a pre-defined function from a class library. The following example is illustrative of pre-defined functions that might be found in a class library according to an embodiment of the present invention, and of an instruction that would be defined from these functions. Typical graphics applications define a pixel by an 8-bit integer for each of three colors such as red, green, and blue. According to the present invention, a class library for graphics applications can include a pre-defined function for red, for example, that defines an unsigned 8-bit declared integer, R, by the function se_uint<8>R; and another pre-defined function would define for the pixel an unsigned 24-bit declared integer, P, by the function se_uint<24>P=(B, G, R); where B and G correspond to blue and green, respectively. In the C++ programming language integers are generally limited to standard bit lengths such as 8, 16, 32 and 64. Accordingly, the ability to create a 24-bit integer, or any integer with a non-standard number of bits, is a beneficial feature of the present invention. Without the ability to define a pixel as a 24-bit integer, one would have to define the pixel as a 32-bit integer, but at the expense of having to carry 8 unused bits.

The advantage of not having to carry unused bits can be further seen when a number of pixels are assigned to a register with a pre-defined width. For instance, a register, W, that has a 128-bit width can accommodate four 32-bit pixels, but the same register can handle five 24-bit pixels. Expressed as an instruction for a programmable logic device 130, assigning five 24-bit pixels to register W would be expressed as WR W=(P4, P3, P2, P1, P0).

Load/Store Instructions

Figure 8:
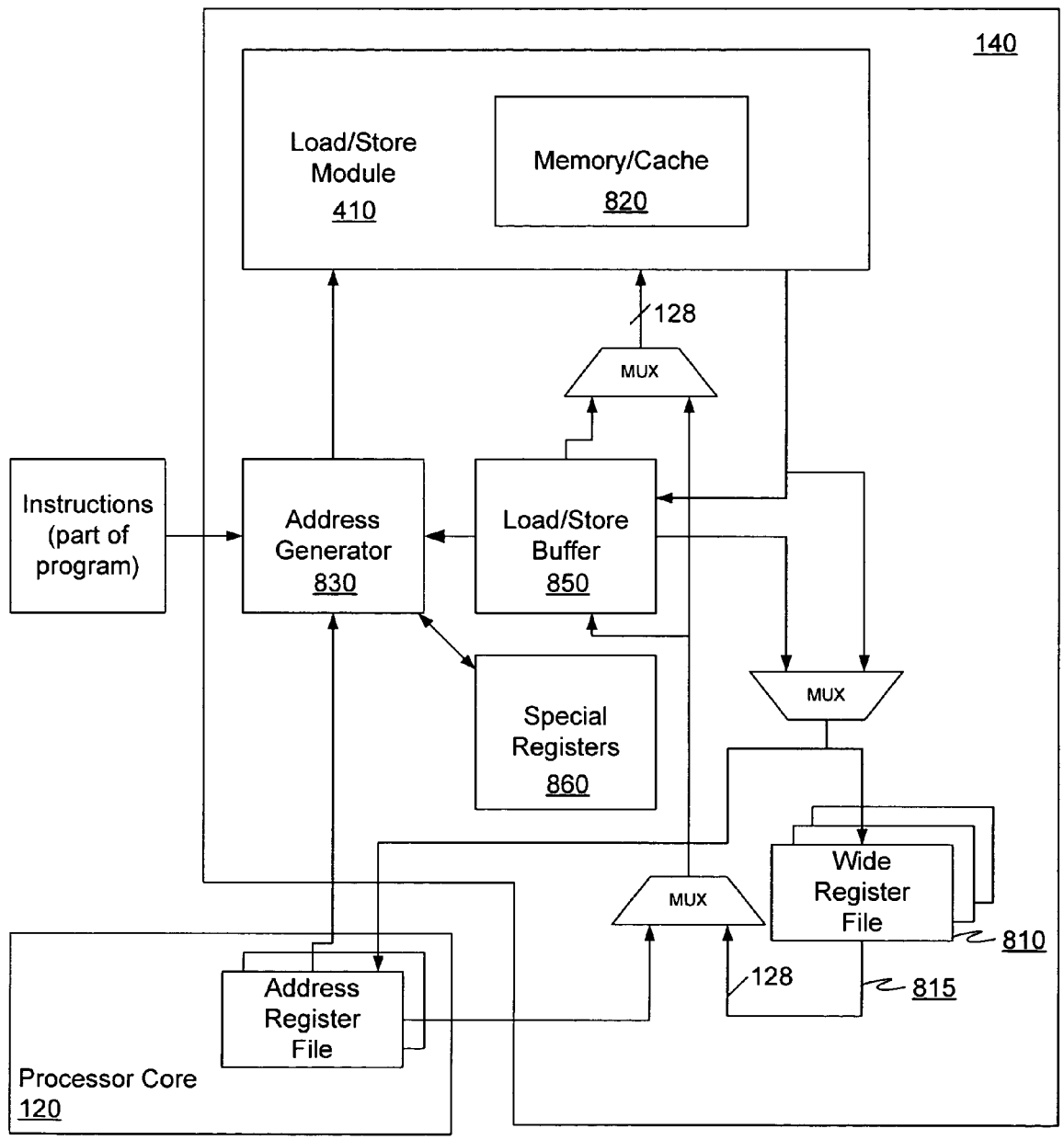
FIG. 8 is a schematic diagram illustrating an embodiment of an extension adapter of the present invention.

FIG. 8 illustrates a novel exemplary architecture for extension adapter 140 that facilitates efficient bit-stream or byte-stream I/O so that processor core 120 can execute either aligned or unaligned load/store instructions (also called get/put instructions, respectively). In one embodiment of the present invention, wide register file 810 is organized into two banks, A and B, each including sixteen-entry, 128-bit wide registers, accessed through up to three read ports (not shown) and four address bits per port (not shown) to select one of the registers. The wide register file of this embodiment can be treated as two separate register files, WRA and WRB. Memory/cache 820 is composed of cache or dual-port data RAM (DPDR) memory. A 128-bit wide bus 815 between wide register file 810 and memory/cache 820 allows a load or store on every clock cycle, provided that data is in memory/cache 820. Address generator 830 provides a virtual address to load/store module 410, and a memory management unit (not shown) within load/store module 410 converts the virtual address into a physical memory address, by summing a base address from address generator 830 with an immediate or indexed offset value, or from an address register with a post-increment by an immediate or indexed amount. Load/store buffer 850 can be considered to be a realignment buffer.

Load/store buffer 850 provides buffering functionality, whereby unaligned load/store instructions can extract data in a streaming fashion for use by processor core 120 and/or ISEF 130. Although the load/store module 410 of this embodiment processes only whole words, e.g. 128-bits wide, streaming data through load/store buffer 850 allows the conversion of aligned data into unaligned data of arbitrary byte- or bit-length. Special registers 860 are provided to hold the current virtual memory address, a direction flag to indicate whether the stream is incrementing or decrementing through memory, and other state information. Byte-streaming load/store instructions of this embodiment thus allow a series of unaligned load/stores, as long as the memory accesses are sequential in nature. Byte-streaming load/store instructions can use any virtual address and need not be aligned to any particular word size. Each load or store ("stream") is comprised of the address, buffering, and other registers used to support a separate series of sequential unaligned accesses. Multiple streams can coexist in a system at once.

In one embodiment, byte-streaming unaligned load/store instructions are implemented by performing full word-wide load/store when required, holding enough data in temporary buffers within load/store buffer 850 so that data is seamless when requested to be returned, and refilling buffers as needed. In one embodiment, byte-streaming load and store instructions transfer from 1 to 16 bytes between memory and a wide register. Any byte address is allowed with no restriction on alignment.

The above-described exemplary methodologies for processing unaligned load/store instructions assume sequential loading of multiple words in order to retrieve data from an earlier-loaded word. As an alternative embodiment, an internal state buffer holds one or two words of data, an unaligned load or store transfers data from this internal state buffer, and the internal state buffer is refilled with data as needed with a single-cycle load or store. For example, an initialization instruction loads aligned word 1 into load/store buffer 850. In synchronism with data being read from aligned word 1, aligned word 2 is loaded into load/store buffer 850. Thus, by performing one extra initialization, load/store module 410 is kept one step ahead of the data being read. This buffer-ahead methodology allows load/store buffer 850 to hold data as needed. This methodology gives unaligned semantics, as data can be read from load/store buffer 850 in an unaligned fashion. A further benefit of this methodology is that data loaded need not be a fixed number of words. In a particular embodiment, up to 16 bytes can be loaded. This variability is provided for in the compiler.

In order for the user to take advantage of its resources, extension adapter 140 of one embodiment provides a set of fixed instructions, comprising moving data to and from external memory into and out of the register files. One embodiment comprises 8-, 16-, 32-, 64- and 128-bit load and store instructions, and bit- and byte-streaming PUT and GET of data. This collection of functionality is defined in one embodiment in the TIE language, and run through Tensilica's TIE compiler. It is contemplated that languages other than TIE can be used with the present invention. These instructions will be fixed once the silicon is created, and are fully implemented using the standard TIE flow. A preferred embodiment including sample TIE code is documented in Appendix A on the associated Master CD-R and Duplicate CD-R including the file "tobruce.tie", a text file of size 40 kilobytes, which CDs were created on Oct. 13, 2003. All copyright in the software code of Appendix A is reserved by its owner(s). Unauthorized creation, duplication, or encoding of the software code listed in Appendix A onto a computer readable medium constitutes patent infringement of the invention as covered by one or more of the claims herein, and unauthorized execution of the software code in Appendix A by a computer processing apparatus constitutes patent infringement of one or more claims of this patent.

BYTE-Streaming Instructions

Initialization instructions are first executed before using byte-streaming load instructions, to identify the stream's initial memory address and direction. The initialization instruction WRGETINIT(D, A) specifies whether to decrement or increment through memory, depending on whether D is true or false, and the value A specifies the address from which data is to be read. The instruction WRGETADV(X) is an additional initialization instruction used to offset the byte pointer by X bytes in either direction without reading anything. This is useful in an embodiment with 128-bit words, for example, when the number of bytes may be larger than 16. This reinitializes the getbytes channel without the need to maintain a redundant copy of the getbytes pointer, thereby saving execution time and register pressure. Once initialized, streaming loads take just one cycle to execute, assuming all the data is in single-cycle access memory.

Load immediate instruction WRGETI(NUM) reads NUM bytes from the current address and returns them in wide register file 810. In an exemplary embodiment, the number of bytes transferred can be specified with a 4-bit immediate value so that between 1 and 16 bytes can be transferred between wide register file 810 and memory/cache 820 while updating the memory address pointer with an increment or decrement as specified in the initialization instruction. The address state register (not shown) is incremented or decremented by the value NUM.

The load indexed instruction WRGETX(VAL) reads VAL bytes from the current address and returns them in wide register file 810. In one embodiment, VAL is treated as a signed 32-bit number "clamped" to the range 0 to 16, such that if VAL <0, 0 bytes are read, and if VAL >16, 16 bytes are read.

The immediate form of getbytes is preferably used to load consecutive bytes, starting from a possibly unaligned address, when the number of bytes to load is known at compile time. This avoids having to put the number of bytes into a register before doing the load, as would be done with WRGETX, thereby reducing execution time and register pressure. In contrast, the indexed form of getbytes is preferably used to load consecutive bytes, starting from a possibly unaligned address, when the number of bytes to load is not known at compile time. This allows the number of bytes to reside in a register that is set at run time.

Load double indexed instruction WRGETXX(VAL) makes it possible to get N bytes but increment or decrement the pointer by M bytes. N and M may be values held in separate registers or packed into a single address register. In one embodiment this instruction uses the lower 16 bits as the number N of bytes to read. The upper 16 bits M specify the amount by which to increment or decrement the current address. Both values are treated as signed 16-bit values, clamped to the range 0 to 16. The address pointer is incremented or decremented by an amount equal to M. For example, the load double indexed instruction makes it very efficient to get a window of N data elements from an array while sliding the window over the array by M.

In one embodiment, byte-streaming store instructions, in contrast to load instructions, involve one initialization instruction. WRPUTINIT(D, A) initializes a byte-streaming store operation. D specifies whether to decrement or increment through memory, depending on whether D is true or false, and the value A specifies the address from which data is to be read.

In one embodiment of the invention, store immediate instruction WRPUTI(NUM) writes NUM bytes from wide register file 810 to the current address, and increments the current address by NUM, a compile-time constant in the range 1 to 16. In one embodiment, indexed store instruction WRPUTX(VAL) allows VAL as a signed 32-bit number clamped to the range 0 to 16. The immediate form of putbytes is preferably used to store consecutive bytes, starting from a possibly unaligned address, when the number of bytes to store is known at compile time. This avoids having to put the number of bytes into a register before doing the store, thereby reducing execution time and register pressure. In contrast, the indexed form of putbytes is preferably used to store consecutive bytes, starting from a possibly unaligned address, when the number of bytes to store is not known at compile time. This allows the number of bytes to reside in a register that is set at run time.

After executing store instructions, flush instructions of one embodiment are preferably executed to complete the transfer to memory and to flush any partial words that may be left in load/store buffer 850. Flush instructions of this embodiment are not needed for load instructions. WRPUTFLUSH() is preferably issued after the last PUT instruction to ensure data is written to memory. Because WRPUTFLUSH() leaves state registers undisturbed following execution, additional PUTs can be executed after PUTFLUSH but without needing to issue PUTINIT instructions.

The following exemplary original code segment demonstrates immediate and indexed forms of both getbytes and putbytes. The inner loop strides through the X and H arrays by DELTA elements at a time, and the outer loop strides through the Y array by DELTA elements at a time. Since DELTA is a constant, for all but the last iteration of the loops WRAGETI is used to load a constant number of X and H bytes and WRAPUTI is used to store a constant number of Y bytes with each pass. However T and N are not known until run time and may not be integer multiples of DELTA. As a result, the final pass of the inner and outer loops use WRAGETX and WRAPUTX to load and store a variable number of bytes depending on the remainder of T/DELTA and N/DELTA.

```
#define DELTA 2
void Fir(short *X, short *H, short *Y, int N, int T)
{
        int t, n;
        WRA x, h, y;
        WRAPUTINIT(0, Y);
        for (n=0, X+=DELTA; n < N-DELTA; n+=DELTA, X+=DELTA) {
                WRAGET0INIT0(1, X);
                WRAGET0INIT1( );
                WRAGET1INIT0(0, H);
                WRAGET1INIT1( );
                for (t=0; t < T-DELTA; t+=DELTA) {
                        WRAGET0I(x, DELTA*2);   //const for all but last iter
                        WRAGET1I(h, DELTA*2);   //const for all but last iter
                        FIR_MAC(x, h, y, t);
                }
                WRAGET0X(x, (T-t)*2);    //var # bytes for last inner iter
                WRAGET1X(h, (T-t)*2);    //var # bytes for last inner iter
                FIR_MAC(x, h, y, t);
                WRAPUTI(y, DELTA*2);     //const forall but last outer iter
        }
        WRAGET0INIT0(1, X);
        WRAGET0INIT1( );
        WRAGET1INIT0(0, H);
        WRAGET1INIT1( );
        for (t=0; t < T-DELTA; t+=DELTA) {
                WRAGET0I(x, DELTA*2);   //const for all but last iter
                WRAGET1I(h, DELTA*2);   //const for all but last iter
                FIR_MAC(x, h, y, t);
        }
        WRAGET0X(x, (T-t)*2);    //var # bytes for last inner iter
        WRAGET1X(h, (T-t)*2);    //var # bytes for last inner iter
        FIR_MAC(x, h, y, t);
        WRAROTX(y, 16-(N-n)*2);
        WRAPUTX(y, (N-n)*2);     //var # bytes for last outer iter
        WRAPUTFLUSH0( );
        WRAPUTFLUSH1( );
}
```

The following exemplary original code segment demonstrates the double indexed form of getbytes. The inner loop computes using 1 element of the H array and 8 elements of the X array. In the first iteration, X[0] through X[7] are used, in the second iteration X[−1] through X[6] are used, and so forth. For example, this is a common operation in convolutions like the direct form Finite Impulse Response filter when multiple multiply-accumulations can be performed in parallel.

```
#define DELTA 8
#define N (DELTA * 5)
#define T 23
void Fir(short *X, short *H, short *Y)
{
        int t, n, delta = ((1*2)<<16) | (DELTA*2);
        short *pH;
        WRA x, h, y;
        WRAPUTINIT(0, Y);
        for (n=0, X+=DELTA; n < N-DELTA; n+=DELTA, X+=DELTA) {
                WRAGET0INIT0(1, X);
                WRAGET0INIT1( );
                pH = H;
                for (t=0; t < T; t++) {
                        WRAGET0XX(x, delta);     //get 8 elems but move ptr 1
                        WRAL16IU(h, pH, 2);
                        FIR8(x, h, y, t);
                }
                WRAPUTI(y, DELTA*2);
        }
        WRAPUTFLUSH0( );
        WRAPUTFLUSH1( );
}
```

The following exemplary original code segment demonstrates the advance getbyte reinitialization instruction. The code moves through a series of packets, each of which begins with a 2-byte length field, followed by a 14-byte header, and then a variable amount of data. The packets are not guaranteed to have any particular byte alignment, so this is a natural application for the getbytes mechanism. A null packet with length equal to 0 follows the last packet.

```
void ProcessPackets(char *input, int *results, int *cnt)
{
        short len;
        WRA data, res;
        WRAGET0INIT0(0, input);
        WRAGET0INIT1( );
        for (n=0; 1; n++) {
                WRAGET0I(data, 16);
                WRAS16I(data, &len, 0);
                if (len == 0) break;
                PROC_HDR(data, res);
                WRAS32IU(res, results, 4);
                WRAGET0ADV(len - 16);
                WRAGET0INIT1( );
        }
        *cnt = n;
}
```

Figure 9:
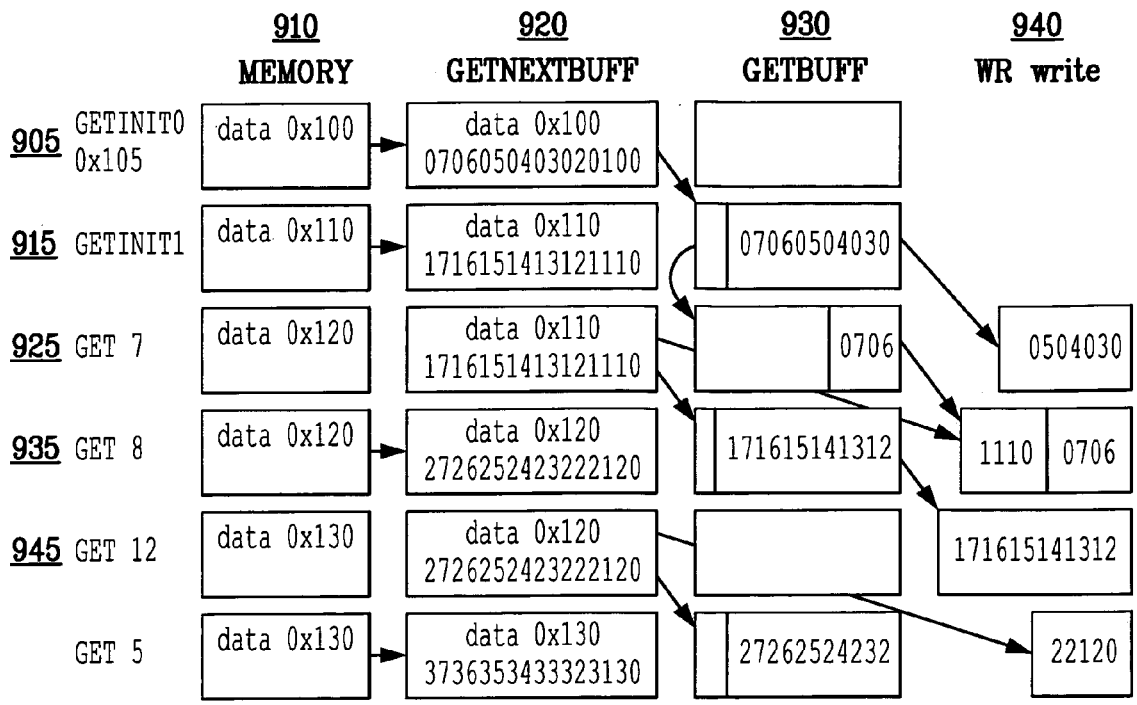
FIG. 9 is a flow diagram illustrating an embodiment of how GET instructions work with internal buffers.

FIG. 9 illustrates an exemplary flow diagram for GET instructions in an incrementing direction, showing movement of data from memory into two staging buffers and then into the wide register file. Load/store buffer 850 of this embodiment comprises two staging buffers GETNEXTBUFF and GETBUFF. In the figure, the state flow is from left to right and from top to bottom, and one character represents one byte in the interest of improving readability. In this example, two initialization instructions are called. The address is unaligned, starting at byte five of a 16-byte quadword. The first initialization instruction GETINIT0 905 loads the complete quadword from the aligned version of the address of memory 910 into a first staging buffer GETNEXTBUFF 920. The next initialization instruction GETINIT1 915 then uses GETNEXTBUFF 920 to load GETBUFF 930, shifting over by five in order to strip off the five unused bytes of the quadword. No data is returned by either initialization instruction. The first true GET, GET7 925 which requests seven bytes, shifts those bytes off GETBUFF 930 and returns them into a wide register 940, and since valid bytes remain in GETBUFF 930, does not preload GETNEXTBUFF 920. The first GET effectively returns seven bytes starting at address 0x105. The following GET instruction GET8 935 requests more bytes than are available in GETBUFF 930, thus the eight bytes requested are a mix of GETNEXTBUFF 920 and GETBUFF 930 data. Here, GETBUFF 930 must receive shifted data from GETNEXTBUFF 920, and GETNEXTBUFF 920 must be refreshed with the next quadword of data. A GET that depletes GETBUFF 930, but doesn't need any data from GETNEXTBUFF 920, allows GETBUFF 930 to remain empty before shifting in from GETNEXTBUFF 920.

Figure 10:
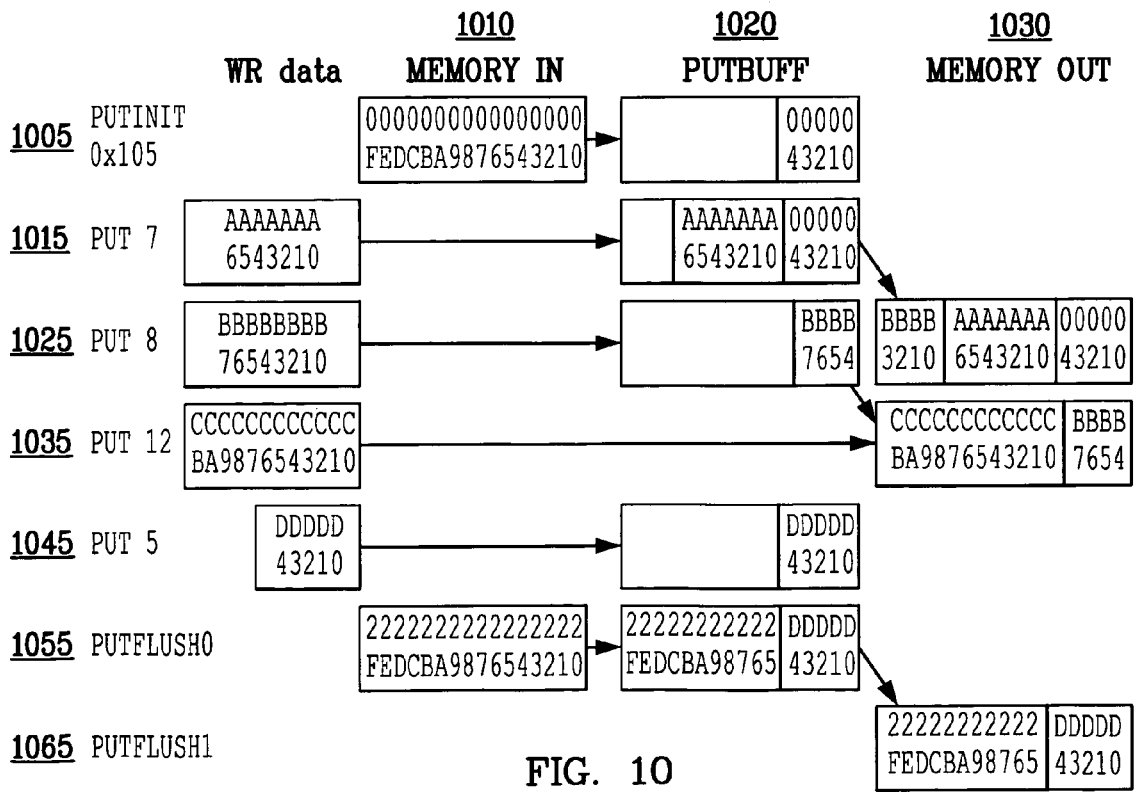
FIG. 10 is a flow diagram illustrating an embodiment of how PUT instructions work with internal buffers.

FIG. 10 illustrates an exemplary flow diagram for PUT instructions in an incrementing direction, showing movement of data from the wide register file to a staging buffer and then to memory. Load/store buffer 850 of this embodiment comprises a single staging buffer PUTBUFF. In the figure, the state flow is from left to right and from top to bottom, and one character represents one byte in the interest of improving readability. The method of this embodiment begins with an initialization instruction PUTINIT 1005, which loads the complete quadword from memory in 1010 that initializes the PUT buffer PUTBUFF1020 with data from the specified memory address. In this example, the desired data is unaligned, so the lower bytes are kept in PUTBUFF 1020 and the upper bytes are thrown away. The first PUT instruction PUT7 1015 puts seven bytes, partially filling the PUTBUFF 1020. The next PUT instruction PUT8 1025 overfills the PUTBUFF 1020, spilling a complete 16 bytes to memory out 1030, and retaining the four bytes that did not get stored. The next PUT instruction PUT12 1035 completely fills PUTBUFF 1020 and spills it to memory out 1030, leaving nothing in the put buffer. The next PUT instruction PUT5 1045 fills PUTBUFF 1020 with five bytes. The first flush instruction PUTFLUSH0 1055 loads valid data from memory in 1010 to completely fill the put buffer, leaving the valid PUT data untouched. The second flush instruction PUTFLUSH1 1065 then executes the store to write the contents of PUTBUFF 1020 to memory out 1030.

BIT-Streaming Instructions

For bit-streaming load/store instructions, the principle of operation is similar to that described above for byte-streaming, except that operations work on arbitrary bit boundaries, and in one embodiment address generator 830 is used rather than wide register file 810. Bit-streaming loads and stores can use any virtual memory address and do not have to be aligned to any particular byte or bit size. In one embodiment, associated with each stream are special registers 860 holding the current virtual memory address (a 35-bit number equal to the byte address together with the bit position within the byte), a direction flag to indicate whether, within a byte, bits stream from bit 7 down to 0 or vice-versa, and other state information.

Before using the bit-stream for loads, the software in one embodiment preferably must initialize the stream with a pair of instructions identifying the stream's initial memory address and direction. The ARGETBITSINIT(E, A, O) instruction prepares for a series of bit load operations, beginning O bits after address A. The value E specifies big-endian order (bit 7 is the first bit within a byte) when true, and little-endian order (bit 0 is the first bit within a byte) when false. An instruction for advancing the pointer is ARGETBIT-SADV(N). In one embodiment this instruction advances by any number of bits at a time without reading anything. This is useful when the number of bits may be larger than 32. This reinitializes the getbits channel without the need to maintain a redundant copy of the getbits pointer, thereby saving execution time and register pressure.

The following exemplary original code segment demonstrates the advance getbits reinitialization instruction. The code moves through a series of blocks of bits, each of which begins with a 14-bit length field, followed by a 22-bit header, and then a variable amount of data. The bit blocks may not be a multiple of 8 in length and are not guaranteed to have any particular byte or bit alignment, so this is a natural application for the getbits mechanism. The last bit block is followed by a null bit block with length equal to 0.

```
void ProcessBitstream(char *input, int *results, int *cnt)
{
        int len, data, res;
        ARGETBITSINIT0(0, input, 0);
        ARGETBITSINIT1( );
        for (n=0; 1; n++) {
                ARGETBITSI(len, 14);
                if (len == 0) break;
                ARGETBITSI(data, 22);
                *results++ = ProcHeader(data);
                ARGETBITSADV(len – (14+22));
                ARGETBITSINIT1( );
        }
        *cnt = n;
}
```

After initialization, get bits immediate instruction ARGET-BITSI(N) reads N bits from memory, where N is a constant. In an exemplary embodiment, from 1 to 32 bits can be transferred between address generator 830 and memory/cache 820 while updating the memory address with an increment. Indexed get bits instruction ARGETBITSX(X) reads X bits from memory, where X is a value in an address register. The immediate form of getbits is preferably used to load consecutive bits, starting from any bit position at a possibly unaligned address, when the number of bits to load is known at compile time. This avoids having to put the number of bits into a register before doing the load, as would be done with ARGETBITSX, thereby reducing execution time and register pressure. In contrast, the indexed form of getbits loads consecutive bits, starting from any bit position at a possibly unaligned address, when the number of bits to load is not known at compile time. This allows the number of bits to reside in a register that is set at run time.

Double indexed load bits instruction ARGETBITSXX(X) retrieves, in one embodiment, between 0 and 32 bits from the location in memory pointed to by the current value of the address state register, while advancing the buffer pointer by a separate value between 0 and 32 bits. In one embodiment, the number of bits to retrieve is contained in the lower half of the address register, and the number of bits to advance the buffer pointer is in the upper half of the address register. These values could also be contained in separate registers rather than being packed into one register. Both numbers are treated as signed and clamped to the range 0 to 32. This permits "peeking" ahead in the bit stream and speculatively reading a maximum number of bits when sometimes fewer bits may actually be needed.

The following exemplary original code segment demonstrates all three forms of getbits. A bitstream is composed of a series of variable-length encoded data values. An encoded data value may be 1 to 19 bits long. The function reads 19 bits speculatively, without advancing the bit pointer, and decodes the bits in a subroutine. If the bits encode a normal data value, the value and the number of bits used are returned. If the decoder determines the data requires an additional sign bit, a flag is set and the function retrieves the bit. If the decoder determines that the bits are an escape code, this is flagged and the number of escape bits is returned so the function can do an indexed getbits to get the necessary bits. Once the number of bits used is known, an indexed getbits is used to skip over them for the next iteration.

```
int ReadVarLenData(char *in, int *out, int *cnt)
{
        int i, err, bits, val, nbits, signed, sign, esc;
        ARGETBITSINIT0(0, in, 0);
        ARGETBITSINIT1( );
        for (i=0; 1; i++) {
                ARGETBITSXX(bits, 19);      //get max bits, don't advance ptr
                err = VarLenDecode(bits, &val, &nbits, &signed, &esc);
                if (err) break;         //0=continue, 1=done, 2=error
                if (signed) {
                        ARGETBITSI(sign, 1);        //get 1 bit sign
                        val = sign ? –val : val;
                }
```

-continued

```
        if (esc) {
                ARGETBITSI(bits, 11);           //skip 11 bits
                ARGETBITSX(bits, nbits);    //escape code, var # bits
                val = EscapeDecode(bits, nbits);
        }
        *out++ = val;
        ARGETBITSX(bits, nbits);            //skip nbits
    }
    *cnt = i;
    return err;
}
```

In one embodiment, bit-streaming store instructions involve one initialization instruction, plus two flush instructions after a series of stores to complete the transfer to memory. ARPUTBITSINIT(E, A, O) prepares for a series of bit store operations, beginning O bits after address A. The value E specifies big-endian order (bit 7 is the first bit within a byte) when true, and little-endian order (bit 0 is the first bit within a byte) when false. Put bits immediate instruction ARPUTBITSI(N) writes N bits from the address register into memory, starting from any bit position at a possibly unaligned address. The immediate put instruction is preferably used when the number of bits to store is known at compile time. Indexed put bits instruction ARPUTBITSX(X) sends X bits to memory, starting from any bit position at a possibly unaligned address, where X in one embodiment is a value between 1 and 32. The indexed put instruction is preferably used when the number of bits to store is not known at compile time. The indexed put instruction effectively does a store of the bits to the address pointed to by the current value of the address state register at run time. The address state register is incremented by the number of bits added. Store instructions are affected by the bit order state, which determines how the bits are stored within the memory.

ARPUTBITSFLUSH0() in one embodiment is preferably issued after the last ARPUTBITS instruction to ensure that data is written to memory. In operation of this embodiment, this instruction expands to two instructions, ARPUTBITS-FLUSH0() followed by ARPUTBITSFLUSH1(). Because WRPUTFLUSH() leaves state registers undisturbed following execution, additional PUTs can be executed after PUT-FLUSH but without needing to issue PUTINIT instructions.

The following exemplary original code segment demonstrates both immediate and indexed forms of putbits. A bitstream, composed of a series of variable-length encoded data values, is being created. Each value in an input array of integers is encoded into a set of bits with a variable length no greater than 32. The indexed putbits is used to store these bits into the bitstream. If a sign bit is needed, the immediate form of putbits is used to store it as well. If an escape code is needed, the indexed form is used to store that as well. At the end, a fixed-length done code is written to the bitstream using the immediate form.

```
void WriteVarLenData(int *in, char *out, int cnt)
{
        int i, bits, val, nbits, signed, sign, esc;
        ARPUTBITSINIT0(0, out, 0);
        for (i=0; i < cnt; i++, in++) {
                VarLenEncode(*in, &bits, &nbits, &signed, &esc);
                ARPUTBITSX(bits, nbits);            //put nbits bits
                if (signed) {
                        sign = (*in < 0) ? 1 : 0;
                        ARPUTBITSI(sign, 1);        //put 1 bit sign
                }
                if (esc) {
                        EscapeEncode(*in, &bits, &nbits);
                        ARPUTBITSX(bits, nbits);    //escape code, var # bits
                }
        }
        ARPUTBITSI(DONECODE, DONECODESIZE);   //put done code
        ARPUTBITSFLUSH0( );
        ARPUTBITSFLUSH1( );
}
```

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. Accordingly, the specification and drawings are to be regarded as illustrative rather than restrictive.

What is claimed is:

1. A method of processing data, the method comprising:
    receiving a sequence of aligned data, the aligned data being aligned relative to a memory;
    receiving a user defined instruction;
    loading unaligned data which is a subset of the sequence of aligned data into a programmable instruction set extension fabric;
    executing the user defined instruction using the unaligned data to create an unaligned instruction output;

receiving the unaligned instruction output;
aligning unaligned instruction output to the memory to create aligned data; and
storing the aligned data in the memory.

2. The method of claim 1, wherein receiving the sequence of aligned data is controlled by a processor using a load/store instruction, and the user defined instruction is received from the processor.

3. The method of claim 1, wherein the sequence of aligned data is received from a first location within the memory and the aligned data is written to a second different location within the memory.

4. A method for processing data sequences in a computing system, the method comprising:
   initializing a load/store buffer in an extension adapter by loading a first aligned word into a load/store buffer;
   further initializing the load/store buffer by loading a second aligned word into the load/store buffer, alignment of the first aligned word and the second aligned word being relative to a memory accessible via a processor;
   reading an unaligned data sequence from the load/store buffer into a register file of an extension adapter for use by an instruction received from the processor, the unaligned data sequence including at least part of the second aligned word;
   loading additional aligned words to the load/store buffer to replace the first aligned word and the second aligned word;
   executing the unaligned data sequence; and
   changing a memory address pointer by an amount less than a length of the second aligned word to point to a next unaligned data sequence to be read.

5. The method of claim 4, wherein each of the data sequences has a length of one byte.

6. The method of claim 4, wherein each of the data sequences has a length of one bit.

7. The method of claim 4, wherein the instruction received from the processor is a member of an extensible instruction set.

8. The method of claim 4, wherein each unaligned data sequence has a length less than a length of the second aligned word.

* * * * *